United States Patent
Andersson et al.

(10) Patent No.: US 11,706,831 B2
(45) Date of Patent: Jul. 18, 2023

(54) DUAL MODE VEHICLE TO VEHICLE COMMUNICATIONS

(71) Applicant: Telefonaktiebolaget LM Ericsson (publ), Stockholm (SE)

(72) Inventors: Håkan Andersson, Vaxholm (SE); Maciej Muhleisen, Aachen (DE); Tomas Nylander, Värmdö (SE); Evanny Obregon, Solna (SE); Stefano Sorrentino, Solna (SE); Erika Tejedor, Stockholm (SE); Henrik Voigt, Bromma (SE); Yunpeng Zang, Wuerselen (DE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 685 days.

(21) Appl. No.: 16/321,608

(22) PCT Filed: Jul. 6, 2018

(86) PCT No.: PCT/SE2018/050740
§ 371 (c)(1),
(2) Date: Jan. 29, 2019

(87) PCT Pub. No.: WO2019/035753
PCT Pub. Date: Feb. 21, 2019

(65) Prior Publication Data
US 2021/0360721 A1    Nov. 18, 2021

Related U.S. Application Data

(60) Provisional application No. 62/545,477, filed on Aug. 14, 2017.

(51) Int. Cl.
*H04W 76/16* (2018.01)
*H04W 4/12* (2009.01)
*H04W 48/18* (2009.01)
*H04W 92/18* (2009.01)

(52) U.S. Cl.
CPC ............. *H04W 76/16* (2018.02); *H04W 4/12* (2013.01); *H04W 48/18* (2013.01); *H04W 92/18* (2013.01)

(58) Field of Classification Search
CPC ........................... H04W 4/44; H03M 13/1105
(Continued)

(56) References Cited

U.S. PATENT DOCUMENTS

2017/0317819 A1* 11/2017 Hu ........................ H04L 9/0643
2017/0359209 A1* 12/2017 Kang ................... H04B 7/0617
(Continued)

FOREIGN PATENT DOCUMENTS

| WO | 2017007104 A1 | 1/2017 |
| WO | 2017052488 A1 | 3/2017 |

OTHER PUBLICATIONS

Qualcomm Incorporated, "Co-channel coexistence between V2V and DSRC", 3GPP TSG-RAN WG1 #85, Nanjing, China, May 23, 2016, pp. 1-4, R1-164457, 3GPP.
(Continued)

*Primary Examiner* — Kiet M Doan
(74) *Attorney, Agent, or Firm* — Coats & Bennett, PLLC

(57) ABSTRACT

A wireless device (100) is configured for dual mode V2X communications over multiple short range radio interfaces. The wireless device (100) is configured to transmit ITS messages over a first short range radio interface configured to operate according to a first communication standard (e.g. PC5 or IEEE 802.11p), and to receive ITS messages over both the first short range radio interface and a second short radio interface configured to operate according to a second communication standard. Implementing the transmitter chain of only one technology, either PC5 or IEEE 802.11p, at each wireless device (100) reduces complexity and mitigates co-channel and adjacent channel interference that is
(Continued)

caused by uncoordinated and concurrent transmissions of different technologies from the same wireless device. Implementing receiver chains for both PC5 and 802.11p allows the wireless device (100) to receive signals in the ITS frequency band regardless of which technology the transmitting device is using.

29 Claims, 9 Drawing Sheets

(58) Field of Classification Search
USPC .................................. 375/240.08; 455/562.1
See application file for complete search history.

(56) References Cited

U.S. PATENT DOCUMENTS

| | | | |
|---|---|---|---|
| 2018/0184270 A1 | 6/2018 | Chun et al. | |
| 2018/0249525 A1* | 8/2018 | Brahmi | G08G 1/161 |
| 2018/0322785 A1* | 11/2018 | Jerichow | G08G 1/162 |
| 2019/0007812 A1* | 1/2019 | Shilov | H04W 4/50 |
| 2019/0182700 A1* | 6/2019 | Kim | H04W 4/46 |
| 2019/0253852 A1* | 8/2019 | Boström | H04L 67/12 |
| 2020/0053527 A1* | 2/2020 | Nylander | H04W 4/40 |
| 2020/0304958 A1* | 9/2020 | Xu | H04W 76/40 |
| 2021/0006282 A1* | 1/2021 | Faerber | H04B 17/21 |
| 2021/0227356 A1* | 7/2021 | Hwang | H04W 72/0446 |

OTHER PUBLICATIONS

ETSI Technical Committee Interlligent Transmport Systems (ITS), "Intelligent Transport Systems (ITS); Pre-standardization study on ITS architecture; Part 2: Interoperability among heterogeneous ITS systems and backward compatibility", Technical Report, ETSI TR 103 576-2, V0.0.1, Jan. 1, 2018, pp. 1-12, ETSI.

* cited by examiner

DUAL MODE VEHICLE TO VEHICLE COMMUNICATIONS

TECHNICAL FIELD

The present disclosure relates generally to vehicle-to-vehicle communications and, more particularly to dual mode vehicle-to-vehicle communications using multiple radio technologies.

BACKGROUND

There is an ongoing effort to increase traffic safety, one initiative being to equip vehicles with short range radio interfaces and to exchange information between vehicles that can be used to mitigate accidents, optimize traffic flows, etc. These vehicle-to-vehicle (V2X) communication systems, known as Intelligent Transport Systems (ITS), are being specified and tested in many places.

A vehicle supporting ITS would typically implement an ITS application as part of an On Board Unit (OBU), which is also known as a Telematics Control Unit (TCU). The OBU is typically connected to the vehicle's internal system so that it can obtain information from the vehicle sensors, or influence the behavior of the vehicle. The information obtained from vehicle sensors can be transmitted over the short range radio interface to benefit other vehicles, e.g., a vehicle can transmit that it detected a slippery road, or it can transmit information about its position, speed velocity, etc. The latter is often transmitted periodically or semi-periodically. A receiving vehicle can thus be prepared for a slippery road, or made aware of the presence of surrounding vehicles. This type of information exchange can be achieved using a mobile cellular network as well. Indeed, a combination of cellular and short range technology is likely to be the most suitable solution to improve road safety and traffic efficiency.

There are two short range V2X communication technologies able to support ITS safety services in the spectrum allocated for ITS, e.g. 5875 MHz to 5905 MHz. The two technologies are the Cellular-ITS (C-ITS) Sidelink standard (also known as PC5) being developed by the Third Generation Partnership Project (3GPP) based on Long Term Evolution (LTE) technology, and the Institute of Electrical and Electronics Engineers (IEEE) 802.11p standard (also known as Dedicated Short Range Communication (DSRC)). The 3GPP based technology that includes both a cellular long range radio interface (i.e. the Uu interface) and a short range radio interface (i.e. Sidelink or PC5) is also known as Cellular-V2X (C-V2X) or LTE-Vehicle (LTE-V).

According to the IEEE 802.11 standard, the physical (PHY) layer of the IEEE 802.11p radio interface is based on Orthogonal Frequency Division Multiplexing (OFDM) and the Medium Access Control (MAC) layer of IEEE 802.11p is based on the asynchronous Carrier Sense Multiple Access/ Collision Avoidance (CSMA/CA) protocol. The PC5 radio interface, according to its realization in LTE Release 14, uses SC-FDMA for the PHY layer and synchronized MAC for the MAC layer. The different PHY and MAC layer specifications prevent devices using these two short range radio technologies from directly communicating with each other at the radio level. This means that a IEEE 802.11p only V2X device and a PC5 only V2X device cannot communicate with each other, though both use the same upper layer ITS protocols to support the same ITS services. In addition to the short range V2X communication technologies in the 5.9 GHz band, long-range V2X communication over a LTE network using the LTE Uu-interface is possible. Long range V2X communication may be used, for example, to provide dynamic map information to the vehicle and supply security certificates to the short range V2X communication device. Long range V2X communication is also an indispensable element of the deployment of C-ITS for vehicles and other road users. It is foreseen that long-range V2X communication using cellular Uu interface can also support ITS safety services. However, due to the imperfect coverage of cellular network and the ubiquity requirement of ITS safety services, the LTE Uu interface may not be considered as a full substitute for the short range V2X communication for ITS safety services.

Given that the primary goal of ITS services is to improve road safety, it is unacceptable that vehicles and road users using different short range V2X technologies for ITS safety services cannot communicate with each other. Therefore, interoperability between different short range V2X technologies, i.e. PC5 and IEEE 802.11p, is required for ITS safety services.

Installing both PC5 and IEEE 802.11p radio devices, which have respective transmit/receive (TX/RX) chains and antenna settings, on each ITS vehicle may enable interoperation between C-V2X Sidelink and 802.11p. However, this solution doubles the cost and complexity of short-range V2X communication and may not be acceptable by automotive original equipment manufacturers (OEMS). Also, due to lack of coordination between PC5 and IEEE 802.11p radio devices, consistent transmissions on both radio interfaces from the same vehicle can result in severe co-channel and adjacent channel interference at the receivers.

Using the long range LTE Uu interface to relay ITS safety messages between PC5 and IEEE 802.11p radio devices is another optional solution. However, considering the imperfect coverage of cellular network, this solution cannot fulfill the ubiquity requirement for ITS safety services. Also, this solution may involve in additional charge for the usage of licensed frequency band by LTE Uu interface, which makes it financially unattractive to the automotive OEMs.

SUMMARY

The present disclosure provides methods and apparatus enabling dual-mode V2X communications over multiple short range radio interfaces (e.g. PC5 and IEEE 802.11p interfaces). The wireless device is configured to transmit ITS messages over a first short range radio interface configured to operate according to a first communication standard (either (e.g. PC5 or IEEE 802.11p), and to receive ITS messages over both the first short range radio interface and a second short radio interface configured to operate according to a second communication standard. Implementing the transmitter chain of only one technology, either PC5 or IEEE 802.11p, at each wireless device reduces complexity and mitigates co-channel and adjacent channel interference that is caused by uncoordinated and concurrent transmissions of different technologies from the same wireless device. Implementing receiver chains for both PC5 and 802.11p allows the wireless device to receive signals in the ITS frequency band regardless of which technology the transmitting device is using.

Embodiments of the disclosure provides methods and apparatus that allow for different radio technologies sharing a common frequency allocation, but potentially transmitting on different frequencies within this band, to communicate with each other, without requiring an implementation that would force a chipset supplier to implement two completely separate modems for each technology. This is achieved in exemplary embodiments by providing a solution using one or more decoders on the receiver side that are capable of decoding the air interface traffic of either radio technology, while only transmitting on one of the technologies. The dual technology decoding will likely be able to use a single common radio frequency (RF) front end, feeding either into a decoder that has software that is able to demodulate both radio interface technologies, or into two separate decoders— one for ach radio interface technology.

In addition, if the solution provides support for cellular connectivity over an LTE Uu radio interface in addition to the short range V2X communication on the ITS band (e.g. 5.9 GHz band), the LTE demodulator can also demodulate radio communication in the ITS band, with little or no additional complexity, Thus the complexity penalty to implement the proposed solution for mutual interoperability in a IEEE 802.11p/LTE cellular hybrid modem will likely be very low or none. The proposed solutions enable mutual interoperability between V2X devices with very limited cost and complexity compared with the foreseen implementation of using several modems for a hybrid C-V2X OBU (UE). The solutions described herein can also be applied to a Road Side Unit (RSU) as well as an onboard unit in a vehicle.

On aspect of the disclosure comprises methods implemented by a wireless device configured for short range communications. The wireless device transmits ITS messages over a first short range radio interface configured to operate according to a first communication standard. The wireless device further receives an ITS message from a first remote device over the first short range radio interface. Finally, the wireless device receives ITS messages from a second remote device over a second short range radio interface configured to operate according to a second communication standard.

Another aspect of the disclosure comprises a wireless device configured to transmit ITS messages over a first short range radio interface configured to operate according to a first communication standard, receive an ITS message from a first remote device over the first short range radio interface, and receive an ITS message from a second remote device over a second short range radio interface configured to operate according to a second communication standard. In one embodiment, the wireless device comprises an interface circuit for communicating with remote devices over multiple short range radio interfaces; and a processing circuit. The processing circuit is configured to transmit Intelligent Transport Systems (ITS) messages over a first short range radio interface configured to operate according to a first communication standard. The processing circuit is further configured to receive an ITS message from a first remote device over the first short range radio interface, and to receive an ITS message from a second remote device over a second short range radio interface configured to operate according to a second communication standard.

Another aspect of the disclosure comprises a computer program comprising executable instructions that, when executed by a processing circuit in a wireless device, causes the wireless device to transmit ITS messages over a first short-range radio interface, receive an ITS message from a first remote device over the first short range radio interface, and receive an ITS message from a second remote device over a second short range radio interface configured to operate according to a second communication standard.

Another aspect of the disclosure comprises a carrier containing a computer program as described in the preceding paragraph, wherein the carrier is one of an electronic signal, optical signal, radio signal, or computer readable storage medium.

Another aspect of the disclosure comprises a non-transitory computer-readable storage medium containing a computer program comprising executable instructions that, when executed by a processing circuit in a wireless device in a wireless communication network causes the wireless device to transmit ITS messages over a first short-range radio interface, receive an ITS message from a first remote device over the first short range radio interface, and receive an ITS message from a second remote device over a second short range radio interface configured to operate according to a second communication standard.

DETAILED DESCRIPTION

Figure 1A:
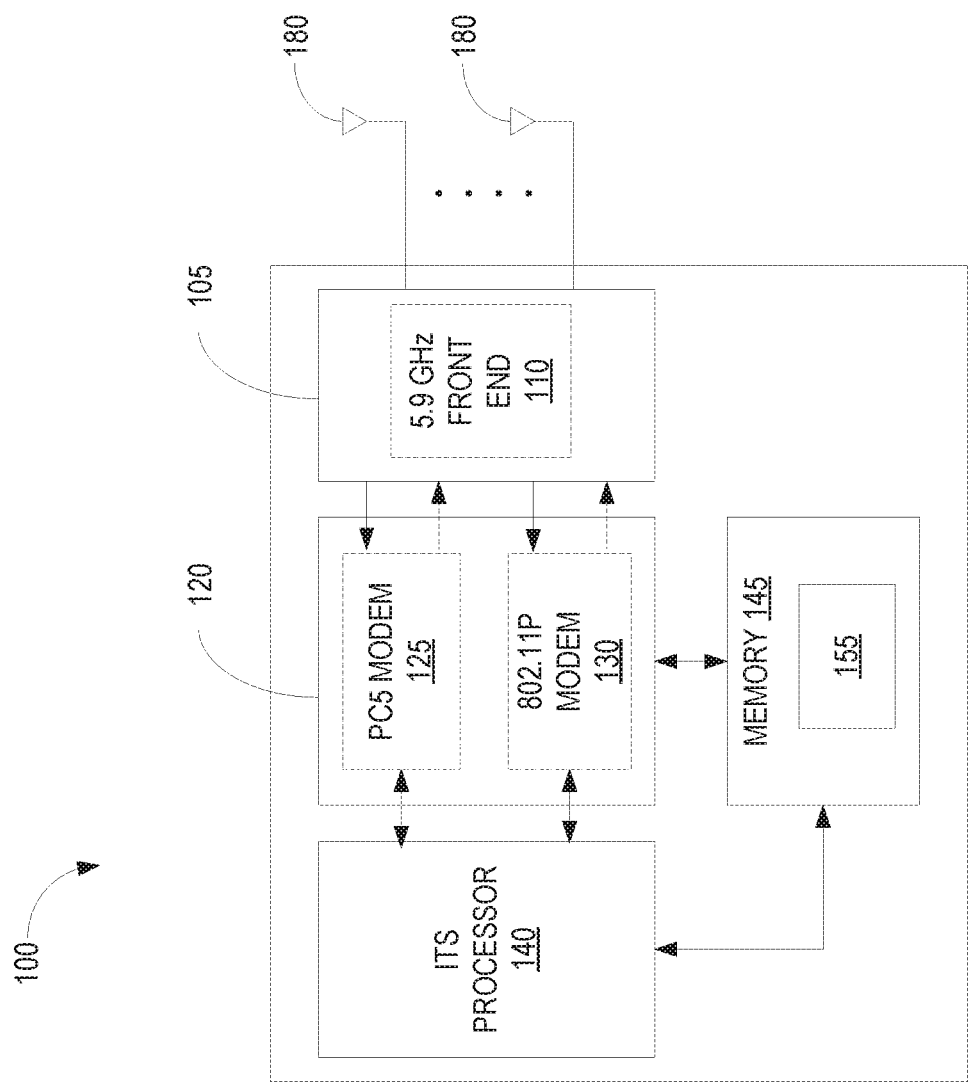
FIG. 1A illustrates a wireless device configured for dual mode V2X communications according to a first embodiment.

Referring now to the drawings, embodiments of a wireless device 100 configured for dual mode V2X communications will be described. The wireless device 100 may comprise, for example, an OBU in a vehicle or a roadside unit. The exemplary embodiments are described in the context of a wireless device 100 configured to operate according to the 3GPP PC5 and IEEE 802.11p standards. Those skilled in the art will appreciate, however, that the techniques described herein are not limited to these communication standards, and can be adapted to other communication standards. Also, while the exemplary embodiments discuss only two short range radio interfaces, those skilled in the art will appreciate that the same principles can be extended to three or more short range radio interfaces. For convenience, similar reference numerals are used throughout the disclosure to indicate similar components.

Currently, 3GPP PC5 and IEEE 802.11p are the two main short range communication standards for V2X communications. Wireless devices 100 operating according to these two standards may transmit signals on the same frequency channel, or on different frequency channels in the same frequency band.

According to one aspect of the disclosure, a wireless device 100 is configured with two short range radio interfaces, e.g., a PC5 interface and a 802.11p interface, each operating in the same frequency band. One interface is used for transmitting only while the other interface is used for both transmitting and receiving. Implementing the transmitter chain of only one technology, either PC5 or IEEE 802.11p, at each wireless device 100 reduces complexity and mitigates co-channel and adjacent channel interference that is caused by uncoordinated and concurrent transmissions of different technologies from the same wireless device 100. Implementing receiver chains for both PC5 and 802.11p allows the wireless device 100 to receive signals in the ITS frequency band regardless of which technology the transmitting device is using.

FIG. 1A illustrates an exemplary wireless device 100 for dual mode V2X communications. The wireless device 100 includes an interface circuit 105, a processing circuit 120, an ITS processor 140, and memory 145. The interface circuit 105 couples to one or more antennas 180 and comprises the RF circuitry necessary for communicating with other V2x communication devices over a wireless communication channel. In one embodiment, the interface circuit 105 includes a front end circuit 110 that covers all usable frequency channels in the 5.9 GHz frequency band or other frequency band allocated for ITS. Thus, the front end circuit 110 can be used by either PC5 or IEEE 802.11p to 1) transmit signals on any of the frequency channels in this frequency band, and/or 2) receive signals from any frequency channel in this frequency band.

Processing circuit 120 comprises circuitry for controlling the wireless device 100 and baseband processing of signals transmitted and received over the PC5 and/or 802.11p interfaces. Processing includes, for example, coding and modulation of signals transmitted over one of the PC5 and 802.11p radio interfaces, and demodulation and decoding of signals received over both the PC5 and 802.11 radio interfaces. Processing circuit 120 may comprise one or more microprocessors, hardware, firmware or a combination thereof. In one embodiment, the processing circuit 120 comprises modems 125 and 130 implementing the PHY and MAC layer signal processing for the PC5 and 802.11p radio interfaces respectively. With software defined radio technology, the modems 125 and 130 can be implemented using the same hardware but with different software for the PC5 and 802.11p radio interfaces respectively. The modems 125 and 130 function as decoders for decoding received signals (e.g., ITS messages) transmitted over the PC5 and 802.11p radio interfaces. The modems 125 may be implemented by a single shared decoder for the PC5 and 802.11p radio interfaces or with separate decoders. In one embodiment, modem 125 is configured to implement both the transmitter and receiver chains for the PC5 radio interface, but only the receiver chain for the 802.11p radio interface. In another embodiment, modem 125 is configured to implement only the receiver chain for the PC5 radio interface, and both the transmitter and receiver chains for the 802.11p radio interface.

The ITS processor 140 comprises circuitry necessary to implement ITS protocols and applications. ITS processor 140 may comprise one or ore microprocessors, hardware, firmware or a combination thereof. The ITS processor 140 can be common for both for PC5 and IEEE 802.11p radio interfaces. The ITS processor 140 generates ITS messages that are transmitted by the wireless device 100 to other remote devices, and processes ITS messages received by the wireless device 100 from the remote devices.

Memory 145 comprises both volatile and non-volatile memory for storing A computer program 155 and data needed by the processing circuit 120 and ITS processor 140 for operation. The computer program 155 comprises executable instruction that are executed by the processing circuit 120 in the wireless device 120, Memory 145 can comprise any tangible, non-transitory computer-readable storage medium for storing data including electronic, magnetic, optical, electromagnetic, or semiconductor data storage. Memory 145 stores a computer program (not shown) comprising executable instructions that configure the processing circuit 120 and ITS processor 140 to implement the methods and procedures described herein. In general, computer program instructions and configuration information are stored in a non-volatile memory, such as a read-only memory (ROM), erasable programmable read-only memory (EPROM) or flash memory. Temporary data generated during operation can be stored in a volatile memory, such as a random access memory (RAM). In some embodiments, the computer program 155 for configuring the processing circuit 120 and ITS processor 140 can be stored in a removable memory, such as a portable compact disc, portable digital video disc, or other removable media. The computer program can also be embodied in a carrier such as an electronic signal, optical signal, radio signal, or computer readable storage medium.

Figure 1B:
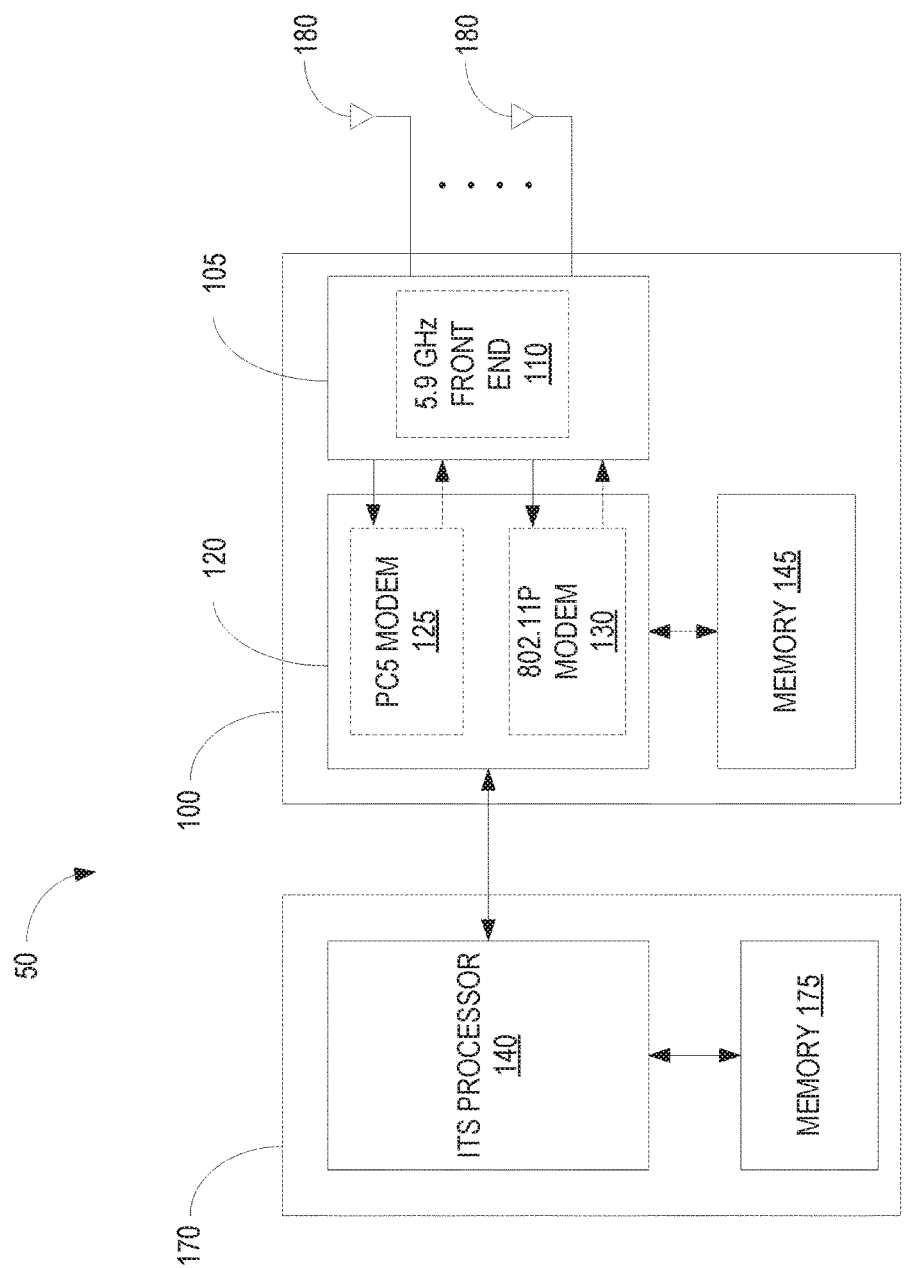
FIG. 1B illustrates a communication system including a host computing device and wireless device configured for dual mode V2X communications according to a second embodiment.

Though shown as part of the wireless device 100 in FIG. 1A (i.e., part of the same physical unit), those skilled in the art will appreciate the ITS processor 140 could be implemented in a stand-alone host computing device 170 that is physically separate from the wireless device 10o as shown in FIG. 1B. In this embodiment, the wireless device 100 and host computing device 170 comprise a communication system 50, The wireless device 100 in this embodiment comprises an interface circuit 105, processing circuit 120, memory 145 and antennas 180 as previously described. The host computing device 170, shown in simplified form in FIG. 1B, comprises the ITS processor 140 and its own memory 175 storing computer programs and data need for operation by the ITS processor 140.

An implementation of a dual mode V2X wireless device 100 as described above involves very limited cost and complexity compared to the alternative of using two or three separate modems, since the transmitter implementation is usually more expensive.

Figure 2:
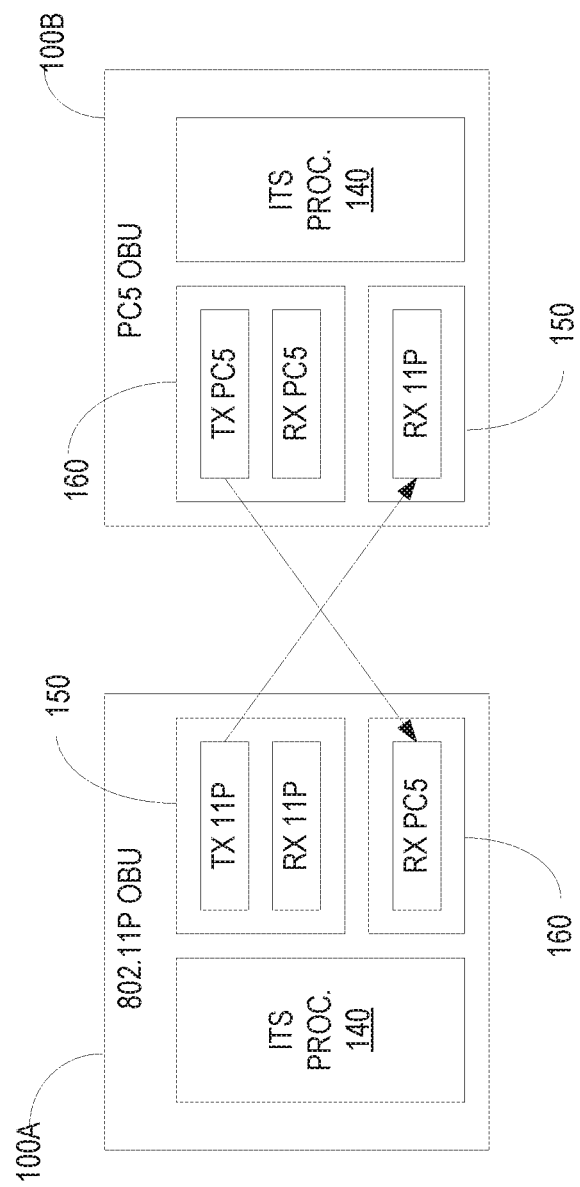
FIG. 2 illustrates dual mode V2X communications between two wireless devices.

FIG. 2 is a schematic diagram illustrating communications between a first wireless device 100A configured to use 802.11p for transmitting and a second wireless device 100B configured to use PC5 for transmitting. Wireless devices 100A and 100B are shown in simplified form. Both wireless devices 100A and 100E include an 802.11p radio interface 150 and a PC5 radio interface 160 for short range for V2X communications. In this example, wireless devices 100A and 100B both uses a single transmitter chain for transmitting and two receiver chains for receiving. More particularly, wireless device 100A uses a 802.11 transmitter chain (TX 11P) for transmitting on the 802.11p radio interface 150, a 802.11p receiver chain (RX 11P) for receiving on the 802.11p radio interface 150, and a PC5 receiver chain (RX PC5) for receiving on the PC5 radio interface 160. Wireless device 100B uses a PC5 transmitter chain (TX 11P) for transmitting on the PC5 radio interface 160, a 802.11p receiver chain (RX 11P) for receiving on the 802.11p radio interface 150, and a PC5 receiver chain (RX PC5) for receiving on the PC5 radio interface 160. As seen in FIG. 2, only one transmitter chain is required in wireless devices 100A and 100B, which reduces co-channel and/or adjacent channel interference. Further, because the 802.11p and PC5 radio interfaces 150 and 160 respectively both use OFDM, it is possible to use common hardware for both PHY layers, with software defined receiver implementations to accommodate differences in the PHY layer and the MAC layer.

According to another aspect of the disclosure, the wireless device 100 may comprise a hybrid wireless device configured to use a long range radio interface (e.g., the LTE Uu interface or other cellular interface) to support ITS services, in addition to the short range radio interfaces. The long range radio interface may operate in a different frequency band (e.g. 2.6 GHz) than the short range radio interfaces, or may operate in the same frequency band.

Figure 3:
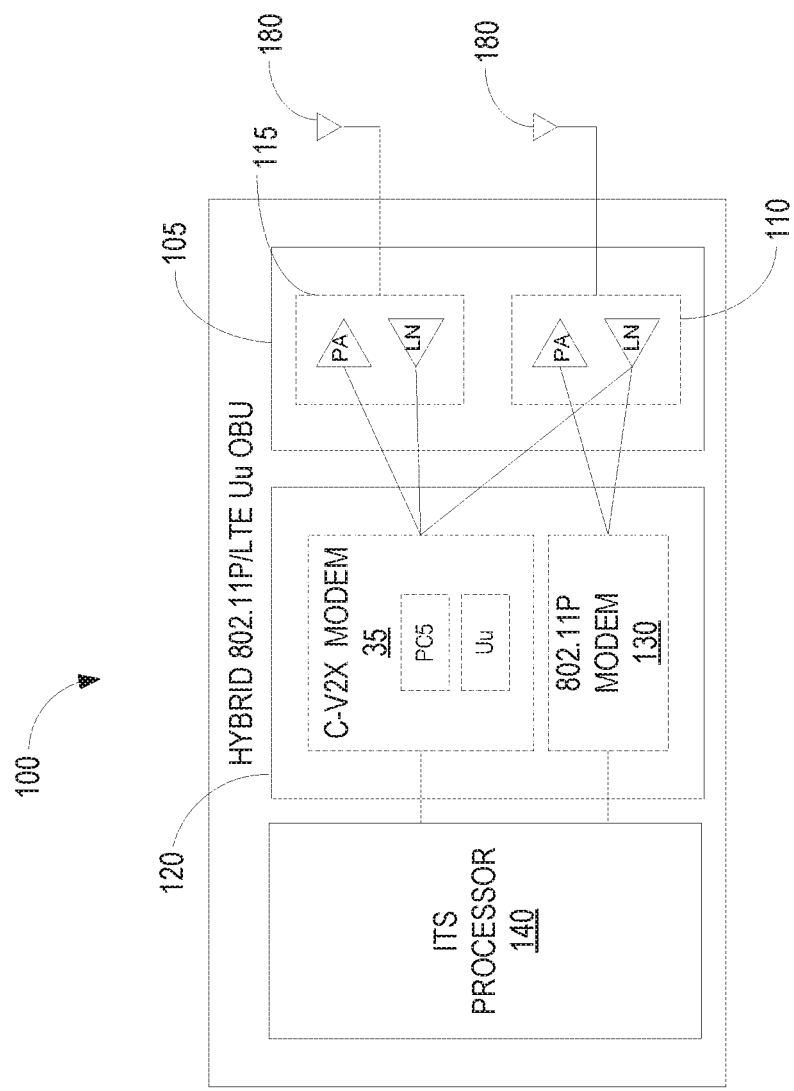
FIG. 3 illustrates a hybrid wireless device configured for dual mode V2X communications and for communications over a mobile cellular network.

FIG. 3 illustrates a wireless device 100 configured to use both a long range radio interface and short range radio interfaces in support of ITS services. In this embodiment, the interface circuit 105 includes a front end circuit 110 for communications in the 5.9 GHz frequency band or other frequency band used for short range communications as previously described. Front end circuit 110 covers all usable frequency channels in the 5.9 GHz frequency band or other frequency band used for ITS. The front end is shared by the PC5 and 802.11p radio interfaces in the entire ITS band (e.g. 5.9 GHz), The interface circuit 105 further comprises a front end circuit 115 for communications with a mobile cellular network in a different frequency band (e.g.; 2.6 GHz frequency band).

The processing circuit 120 comprises a 802.11p modem 130 implementing the PHY and MAC layer signal processing for the 802.11p radio interface, and C-V2X modem 135 implementing PHY and MAC layer signal processing for the PC5 short range radio interface and a long range radio interface (e.g.; LTE Uu, 5G/NR Uu). With software defined radio technology, the modems 130 and 135 can be implemented using the common hardware but with different software to accommodate differences in the PHY and MAC layers. Additionally, the LTE demodulator in the C-V2X modem 135 used to demodulate LTE Uu signals can also demodulate PC5 signals with little or no additional complexity. Thus, the complexity penalty to implement the proposed solution for mutual interoperability in a hybrid modem implementing IEEE 802.11p and LTE Uu will likely be very low or none.

The ITS processor 140, as previously described, comprises circuitry to implement ITS protocols and applications. ITS processor 140 may comprise one or more microprocessors, hardware; firmware or a combination thereof. The ITS processor 140 can be common for both short range (e.g., PC5 and 802.11p) and long range (e.g., LTE Uu, 5G/NR Uu, etc.) radio interfaces.

Figure 4:
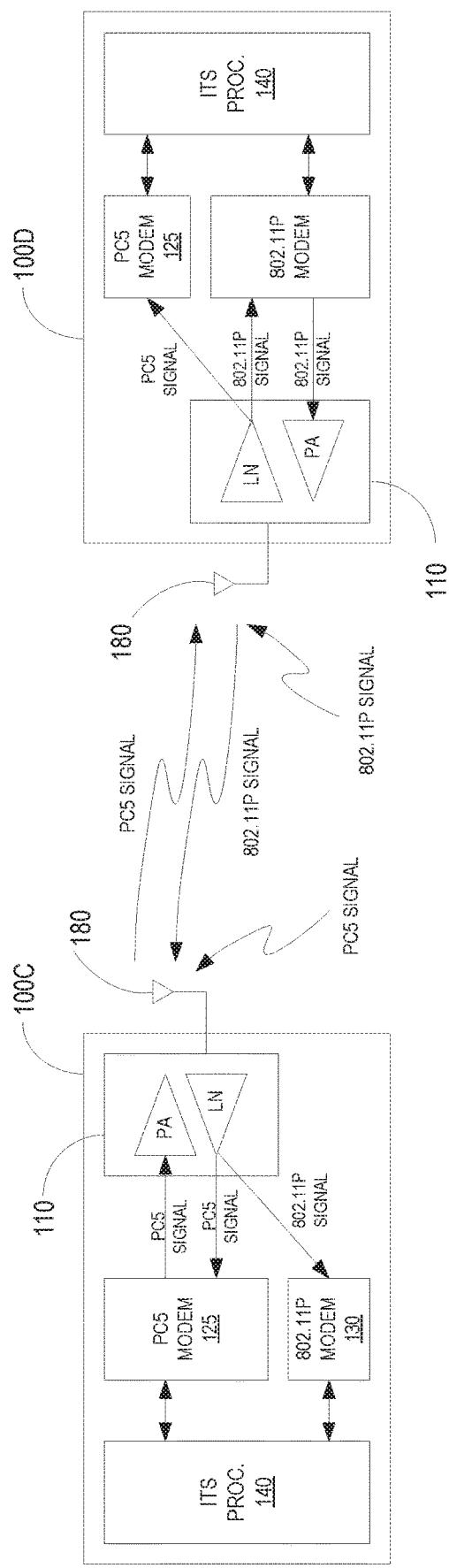
FIG. 4 illustrates two wireless devices configured for dual mode V2X communications.

FIG. 4 illustrates wireless devices 100C and 100D respectively configured for V2X communications over short range radio interfaces according to one embodiment of the disclosure. Wireless device 1000 and 100D comprise a front end circuit 110, PC5 modem 125, 802.11p modem 130, and ITS processor 140. Wireless device 100C uses a PC5 transmitter chain for transmitting, and both 802.11p and PC5 receiver chains for receiving. The PC5 transmitter chain transmits signals on the frequency channel allocated for the PC5 radio interface. The PC5 and 802.11p receiver chains receive signals on respective frequency channels allocated for PC5 and 802.11p radio interfaces respectively, Wireless device 100D uses an 802.11p transmitter chain for transmitting, and both 802.11p and PC5 receiver chains for receiving. The 802.11p transmitter chain transmits signals on the frequency channel allocated for the 801.11p radio interface. The PC5 and 802.11p receiver chains receive signals on respective frequency channels allocated for PC5 and 802.11 radio interfaces respectively.

Figure 5:
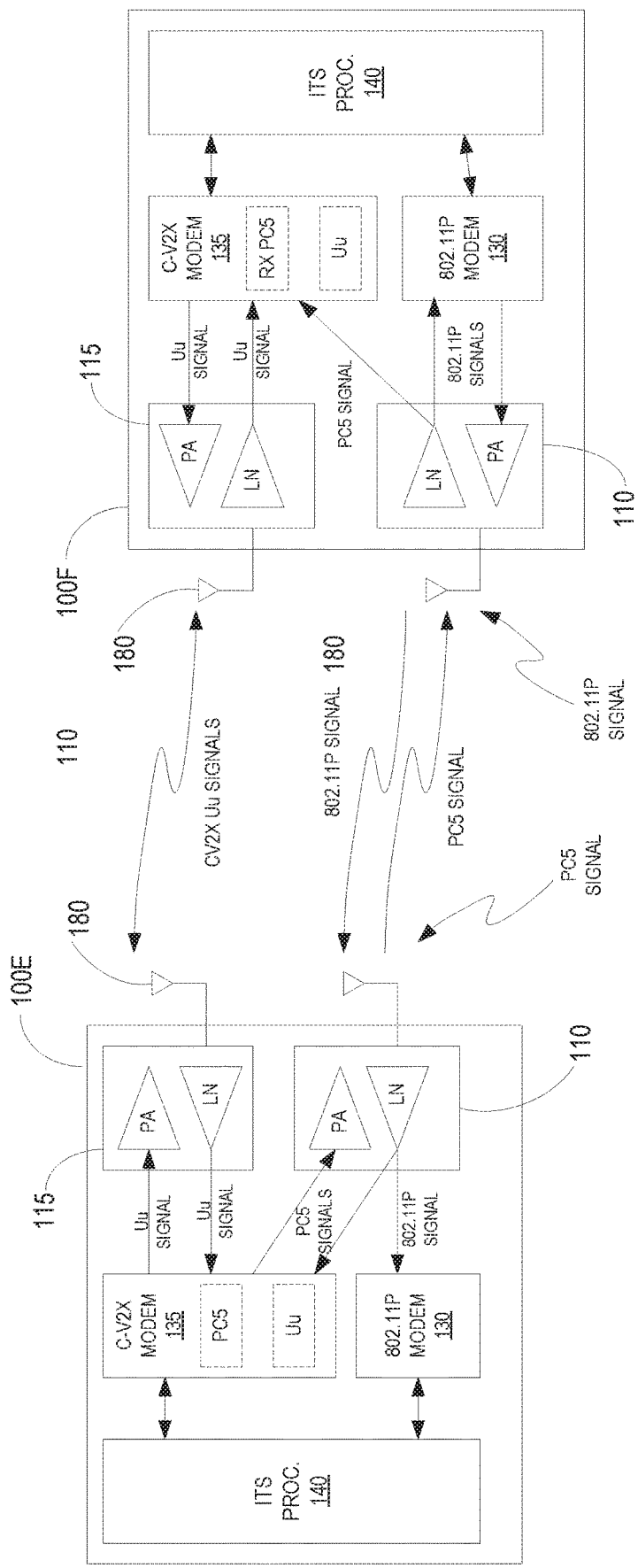
FIG. 5 illustrates two hybrid wireless devices configured for dual mode V2X communications and for communications over a mobile cellular network.

FIG. 5 illustrates hybrid wireless devices 100E and 100F respectively configured for communications with a mobile cellular network using a long range radio interface (LTE Uu interface or 5G/NR Uu interface), as well as dual mode V2X communications over short range radio interfaces. Wireless device 100E and 100F comprise a front end circuit 110, front end circuit 115, 802.11p modem 130, C-V2X modem 135, and ITS processor 140, Front end circuit 110 is used for transmitting and receiving signals on the short range radio interfaces, while front end circuit 115 is used for transmitting and receiving signals on the long range radio interface, C-V2X modem 135 combines a PC5 modem and LTE-Uu modem. The C-V2X modem 135 for wireless device 100E implements both the transmitter and receiver chains for the PC5 radio interface, while the C-V2X modem 135 for wireless device 100F implements only the receiver chain for the PC5 radio interface. In the case of wireless device 100E, the transmitter and receiver chains for the PC5 radio interface can be implemented by reusing the implementation of the Uu radio interface. Similarly, in the case of wireless device 100F, the receiver chains for the PC5 radio interface can be implemented by reusing the implementation of the receiver chain in the Uu radio interface.

Both wireless devices 100E and 100F use a LTE Uu interface or 5G/NR Uu interface for communicating via a mobile cellular network, Wireless device 100E uses a PC5 transmitter chain for transmitting on the PC5 radio interface, and both 802.11p and PC5 receiver chains for receiving on the PC5 and 802.11p radio interfaces. The PC5 transmitter chain transmits signals on the frequency channel allocated for the PC5 radio interface. The PC5 and 802.11p receiver chains receive signals on respective frequency channels allocated for PC5 and 802.11p radio interfaces respectively. Wireless device 100F uses an 802.11p transmitter chain for transmitting on the short range radio interface, and both an 802.11p receiver chain and a PC5 receiver chain for receiving. The 802.11p transmitter chain transmits signals on the frequency channel allocated for the 801.11p radio interface. The PC5 and 802.11p receiver chains receive signals on respective frequency channels allocated for PC5 and 802.11 radio interfaces respectively.

According to another aspect of the disclosure, the wireless device 100 is configured to receive ITS messages concurrently using multiple radio interfaces (e.g., any of PC5, IEEE 802.11p, LTE Uu, 5G/NR Uu). Some of these radio interfaces may operate on overlapping frequency bands and may share parts of the receiver implementations.

According to another aspect of the disclosure, the wireless device 100 is configured to transmit ITS messages using one or more of the radio interfaces used for reception. However, it is noted that a transmitter does not need to be implemented for each of the supported receiver interfaces. In one embodiment, the wireless device 100 may transmit concurrently on multiple radio interfaces (e.g., any of PC5, IEEE 802.11p, LTE Uu, 5G/NR Uu). In one example, the same ITS message is transmitted over at least one short range (PC5, IEEE 802.11p) and at least one long range (LTE Uu, 5G/NR Uu) interface. In another example, the same ITS message is transmitted over multiple short range (PC5 and IEEE 802.11p) interfaces, but not on the long range radio interfaces.

According to another aspect of the disclosure, the wireless device 100 is configured to select between two or more available radio interfaces to use for transmission of an ITS message. The following example selection criteria can be used:

The wireless device 100 may select the transmission interface based on the service associated to the ITS message (e.g., Common Awareness Messages (CAMs) messages use short range radio interfaces while Decentralized Notification Messages (DENMs) are transmitted over both long range and short range radio interfaces).

The wireless device 100 may select the transmission interface based on the priority of the ITS message or other Quality of Service (QoS)-related parameters.

The wireless device 100 may select the transmission interface based on the availability of a suitable mobile network subscription.

The wireless device 100 may select the transmission interface based on coverage of the selected mobile network for the Uu interface.

The wireless device 100 may select the transmission interface based on measured congestion on the radio interfaces.

If implementation of a certain radio interface transmitter is not present, it cannot be selected.

Figure 6:
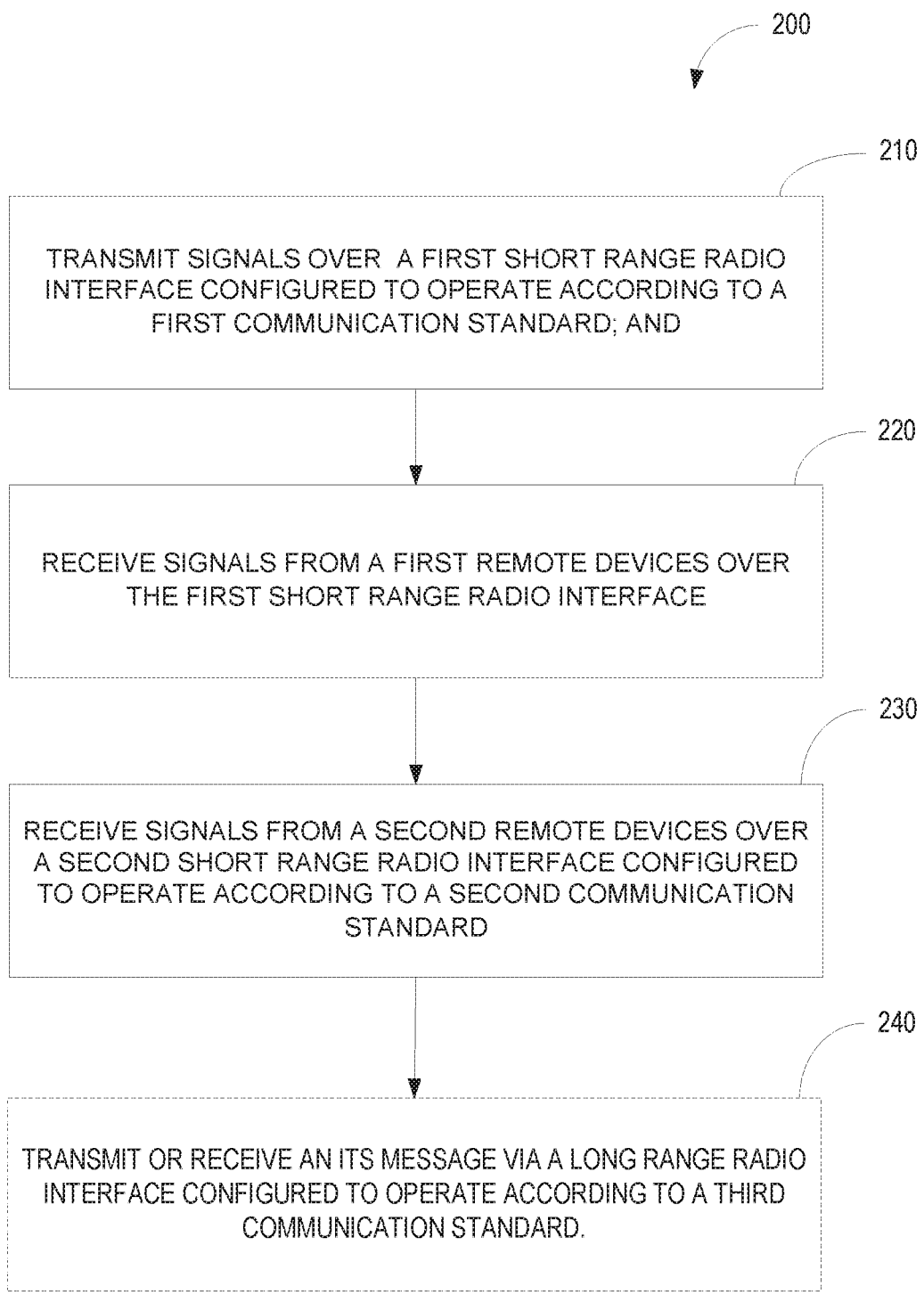
FIG. 6 illustrates an exemplary method implemented by a wireless device configured for dual mode V2X communications.

These selection criteria are not mutually exclusive and may be used in combination. FIG. 6 illustrates an exemplary method 200 implemented by a wireless device 100 configured for short range communications. The wireless device 100 transmits ITS messages over a first short range radio interface configured to operate according to a first communication standard (block 210). The wireless device 100 may transmit multiple copies of the same ITS message or different ITS messages simultaneously using different interfaces. The wireless device 100 further receives an ITS message from a first remote device over the first short range radio interface (block 220). Finally, the wireless device 100 receives ITS messages from a second remote device over a second short range radio interface configured to operate according to a second communication standard (block 230). In some embodiments, the wireless device 100 may optionally transmit and receive ITS messages over a long range radio interface in addition to the short ranges interfaces (block 240). The order of the transmitting and receiving operations described above is given as an example and is not intended to imply any particular order for transmitting and receiving the ITS messages as recited in blocks 210, 220, and 230. Also, the terms "first" and "second" do not imply any order, but are merely labels used to differentiate the two short-range radio interfaces. Those skilled in the art will appreciate that the order in which the ITS messages are transmitted and received is not a material aspect of the disclosure and that the circumstances in a particular situation will affect the order in which the ITS messages are transmitted and received over the different interfaces.

In some embodiments, receiving the ITS messages from the first and second remote devices comprises receiving the ITS messages on the first and second radio interfaces using the same front end circuit.

In some embodiments, receiving the ITS messages from the first and second remote devices comprises decoding the ITS messages received over the first and second short range radio interfaces respectively using separate decoders. In other embodiments, receiving the ITS messages from the first and second remote devices comprises decoding the received ITS messages from the first and second remote devices in a shared decoder configured to decode ITS messages according to both the first communication standard and the second communication standard.

In some embodiments, the method further comprises receiving an ITS message over a long range radio interface configured to operate according to a third communication standard. In some embodiments, receiving an ITS message over a long range radio interface comprises demodulating the ITS messages received from via the long range radio interface using a demodulator shared by the long range radio interface and one of the first and second short range radio interfaces In some embodiments, the method further comprises receiving ITS messages concurrently on multiple radio interfaces. In one example, ITS messages are received concurrently on two short range radio interfaces. In another example, ITS messages are received concurrently a short range radio interface and a long range radio interface.

In some embodiments, the method further comprises transmitting ITS messages over the long-range radio interface. In one example, ITS messages are transmitted concurrently on one of the first and second short range radio interface and a long range radio interface.

Figure 7:
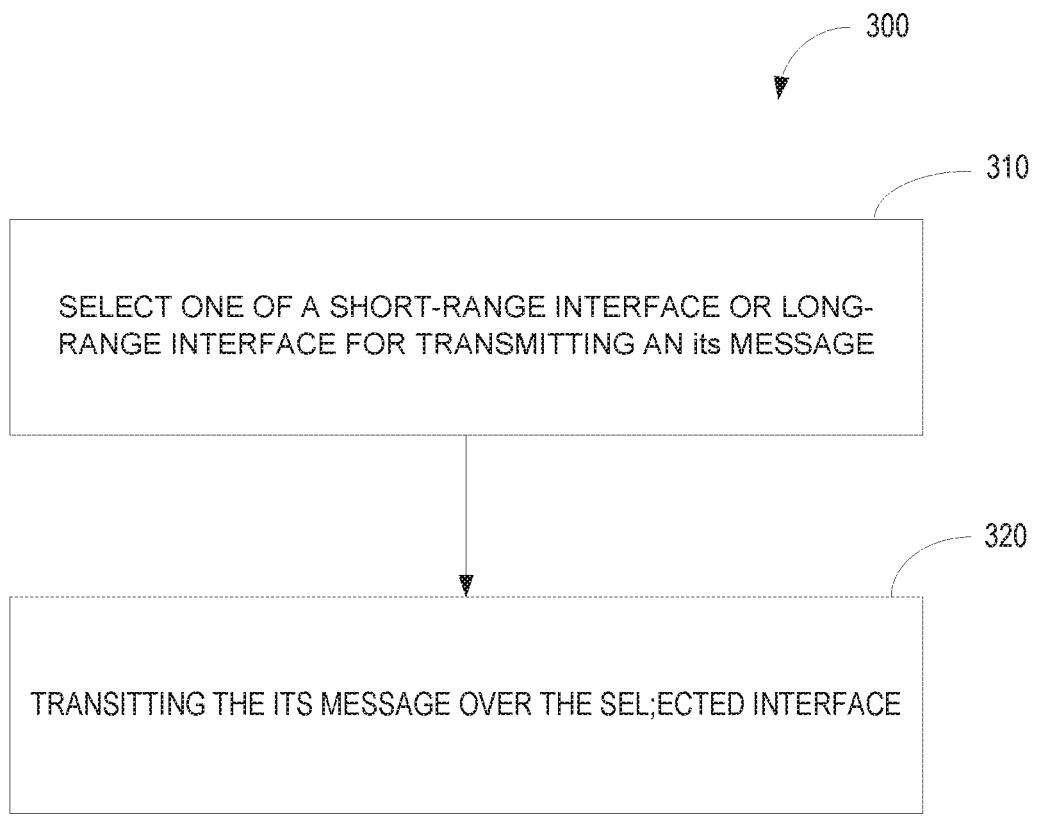
FIG. 7 illustrates a method implemented by hybrid wireless devices configured for dual mode V2X communications and for communications over a mobile cellular network.

FIG. 7 illustrates a selection procedure 300 implemented by the wireless device for the case where the wireless device 100 is capable of transmitting ITS messages over both a short range radio interface (e.g., PC5 or 11p). The wireless device 100 selects one of the interfaces to use for transmission of an ITS message from among two or more available radio interfaces (block 310). The radio interface may be selected based on one or more of:

a type of the ITS message;
a priority of the ITS message;
a Quality of Service (QoS) parameter;
availability of a mobile network subscription;
availability of a mobile network for long range communications; and
congestion on the radio interfaces.

The wireless device 100 then transmits the ITS message on the selected interface (block 320).

Figure 8:
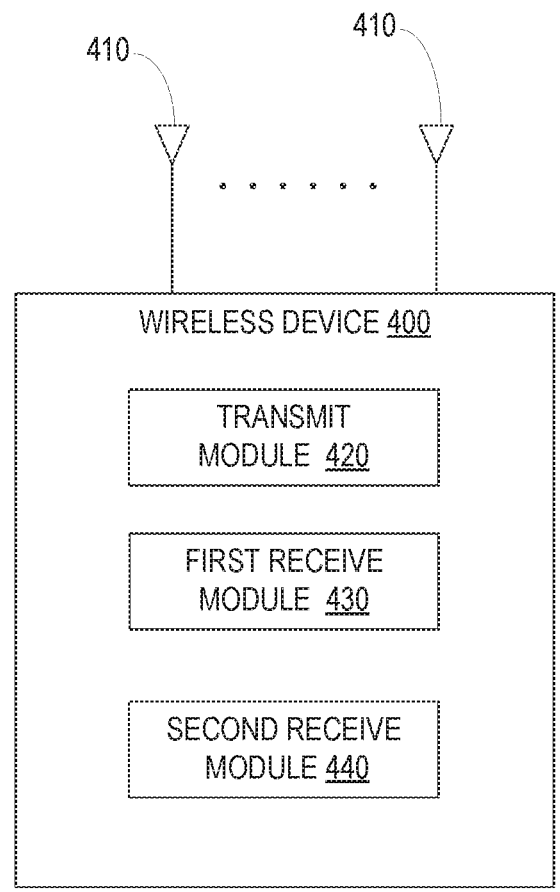
FIG. 8 illustrates a wireless device configured for V2X communications according to an embodiment

FIG. 8 discloses a wireless device 400 configured to perform the method illustrated in FIG. 6. The wireless device 400 comprises one or more antennas 410, a first module 420, a second module 430 and a third module 440. The various modules 420, 430, and 440 can be implemented by hardware and/or by software code that is executed by one or more processors or processing circuits. The transmit module 420 is configured to transmit Intelligent Transport Systems (ITS) messages over a first short range radio interface configured to operate according to a first communication standard. The first receive module 430 is configured to receive an ITS message from a first remote device over the first short range radio interface. The second receive module 440 is configured to receive an ITS message from a second remote device over a second short range radio interface configured to operate according to a second communication standard.

The present disclosure provides methods and apparatus enabling dual-mode V2X communications in the ITS band over multiple short range radio interfaces (e.g. PC5 and IEEE 802.11p interfaces) with lower cost and complexity compared to prior art solutions. This is achieved by configuring the wireless device to transmit ITS messages over a first short range radio interface configured to operate according to a first communication standard (either (e.g. PC5 or IEEE 802.11p), and to receive ITS messages over both the first short range radio interface and a second short radio interface configured to operate according to a second communication standard. Implementing the transmitter chain of only one technology, either PC5 or IEEE 802.11p, at each wireless device reduces complexity and mitigates co-channel and adjacent channel interference that is caused by uncoordinated and concurrent transmissions of different technologies from the same wireless device. Implementing receiver chains for both PC5 and 802.11p allows the wireless device to receive signals in the ITS frequency band regardless of which technology the transmitting device is using.

In addition, if the disclosure provides support for cellular connectivity over an LTE Uu radio interface in addition to the short range V2X communication on the ITS band (e.g. 5.9 GHz band), the LTE demodulator can also demodulate radio communication in the ITS band, with little or no additional complexity, Thus the complexity penalty to implement the proposed solution for mutual interoperability in an IEEE 802.11p/LTE cellular hybrid modem will likely be very low or none.

What is claimed is:

1. A method implemented by a wireless device configured for short range communications, said method comprising:
    transmitting Intelligent Transport Systems (ITS) messages to two or more different groups of wireless devices over a first vehicle-to-vehicle (V2X) interface configured to operate according to a first communication standard; and
    receiving an ITS message from a first remote device in a first one of the different groups of wireless devices over the first V2X interface; and
    receiving an ITS message from a second remote device in a second one of the different groups of wireless devices over a V2X interface configured to operate according to a second communication standard different from the first communication standard.

2. The method of claim 1 wherein receiving the ITS messages from the first and second remote devices comprises receiving the ITS messages with the same front end circuit.

3. The method of claim 1 wherein receiving the ITS messages from the first and second remote devices comprises:
    decoding the received ITS message from the first remote device in a first decoder configured to decode the received ITS messages according to the first communication standard; and
    decoding the received ITS message from the second remote device in a second decoder configured to decode the received ITS messages according to the second communication standard.

4. The method of claim 1 wherein receiving ITS messages from the first and second remote devices comprises:
    decoding the received ITS messages from the first and second remote devices in a shared decoder configured to decode ITS messages according to both the first communication standard and the second communication standard.

5. The method of claim 1 further comprising receiving an ITS message via a long range radio interface configured to operate according to a third communication standard.

6. The method of any one of claims 5 wherein receiving an ITS message via the long range radio interface comprises demodulating the ITS messages received from via the long range radio interface using a demodulator shared by the long range radio interface and one of the first and second V2X interfaces.

7. The method of claim 1 further comprising receiving ITS messages concurrently on multiple radio interfaces.

8. The method according to claim 7 wherein receiving ITS messages concurrently on multiple radio interfaces comprise receiving ITS messages concurrently on two V2X interfaces.

9. The method according to claim 7 wherein receiving ITS messages concurrently on multiple radio interfaces comprise receiving ITS messages concurrently one of said V2X interfaces and a long range radio interface.

10. The method of claim 1 further comprising transmitting an ITS message via a long range radio interface configured to operate according to a third communication standard.

11. The method of claim 10 further comprising transmitting ITS messages concurrently on the long-range radio interface and one of the first and second V2X interfaces.

12. The method of claim 10 further comprising selecting a radio interface for transmission of an ITS message from among two or more available radio interfaces.

13. The method of claim 12 wherein selecting a radio interface for transmission of an ITS message from among two or more available radio interfaces comprises selecting a radio interface based on at least one of:
    a type of the ITS message;
    a priority of the ITS message;
    a Quality of Service (QoS) parameter;
    availability of a mobile network subscription;
    availability of a mobile network for long range communications; and
    congestion on the radio interfaces.

14. The method of claim 1 wherein the first and second V2X interfaces comprises a PC5 interface and 802.11p interface.

15. A wireless device configured for short range communications comprising:
    an interface circuit for communicating with remote devices over multiple vehicle-to-vehicle (V2X) interfaces; and
    a processing circuit configured to:
        transmit Intelligent Transport Systems (ITS) messages to two or more different groups of wireless devices over a first V2X interface configured to operate according to a first communication standard; and
        receive an ITS message from a first remote device in a first one of the different groups of wireless devices over the first V2X interface; and
        receive an ITS message from a second remote device in a second one of the different groups of wireless devices over a second V2X interface configured to operate according to a second communication standard different from the first communication standard.

16. The wireless device of claim 15 wherein the interface circuit includes a common front end circuit for the first V2X interface and the second V2X interface.

17. The wireless device of claim 15 wherein the processing circuit is further configured to:
    decode the received ITS message from the first remote device in a first decoder configured to decode the received ITS messages according to the first communication standard; and
    decode the received ITS message from the second remote device in a second decoder configured to decode the received ITS messages according to the second communication standard.

18. The wireless device of claim 15 wherein the processing circuit is further configured to:
    decode the received ITS messages from the first and second remote devices in a shared decoder configured to decode ITS messages according to both the first communication standard and the second communication standard.

19. The wireless device of claim 15 further comprising receiving an ITS message via a long range radio interface configured to operate according to a third communication standard.

20. The wireless device of any one of claims 19 wherein the processing circuit is further configured to demodulate the ITS messages received from via the long range radio interface using a demodulator shared by the long range radio interface and one of the first and second V2X interfaces.

21. The wireless device of claim 15 wherein the processing circuit is further configured to receive ITS messages concurrently on multiple radio interfaces.

22. The wireless device according to claim 21 wherein the processing circuit is further configured to receive ITS messages concurrently on two V2X interfaces.

23. The wireless device according to claim 21 wherein the processing circuit is further configured to receive ITS messages concurrently one of said interfaces and a long range radio interface.

24. The wireless device of claim 15 wherein the processing circuit is further configured to transmit an ITS message via a long range radio interface configured to operate according to a third communication standard.

25. The wireless device of claim 24 wherein the processing circuit is further configured to transmit ITS messages concurrently on the long-range radio interface and one of the first and second V2X interfaces.

26. The wireless device of claim 24 wherein the processing circuit is further configured to select a radio interface for transmission of an ITS message from among two or more available radio interfaces.

27. The wireless device of claim 26 wherein the processing circuit is further configured to select from among two or more available radio interfaces based on at least one of:
a type of the ITS message;
a priority of the ITS message;
a Quality of Service (QoS) parameter;
availability of a mobile network subscription;
availability of a mobile network for long range communications; and
congestion on the radio interfaces.

28. The wireless device of claim 15 wherein the first and second V2X interfaces comprises a PC5 interface and 802.11p interface.

29. A non-transitory computer-readable storage medium containing a computer program comprising executable instructions that, when executed by a processing circuit in a wireless device in a wireless communication network causes the wireless device to:
transmit Intelligent Transport Systems (ITS) messages to two or more different groups of wireless devices over a first vehicle-to-vehicle (V2X) radio interface configured to operate according to a first communication standard; and
receive an ITS message from a first remote device in a first one of the different groups of wireless devices over the first V2X radio interface; and
receive an ITS message from a second remote device in a second one of the different groups of wireless devices over a second V2X interface configured to operate according to a second communication standard different from the first communication standard.

* * * * *